United States Patent [19]

Zehner

[11] Patent Number: 5,414,676
[45] Date of Patent: May 9, 1995

[54] SONAR ARRAY WITH REDUCED GRATING LOBES

[75] Inventor: William J. Zehner, Lynnhaven, Fla.

[73] Assignee: The United States of Americas as represented by the Secretary of the Navy, Washington, D.C.

[21] Appl. No.: 213,962

[22] Filed: Mar. 16, 1994

[51] Int. Cl.⁶ ............................................. G01S 15/08
[52] U.S. Cl. .................................... 367/103; 367/905
[58] Field of Search ............... 367/103, 104, 105, 119, 367/120, 121, 138; 342/154, 157

[56] References Cited

U.S. PATENT DOCUMENTS

4,276,779  7/1981  Davis, Jr. ............................ 367/105

Primary Examiner—Daniel T. Pihulic
Attorney, Agent, or Firm—Edward J. Connors, Jr.; William C. Townsend

[57] ABSTRACT

A pulsed transmission, single frequency, high resolution sonar system has reduced grating (side) lobes achieved by employing mechanically fixed antenna array stave tilt angles together with electronic focussing in which phase shifts are substituted for time delays.

2 Claims, 6 Drawing Sheets

SONAR ARRAY WITH REDUCED GRATING LOBES

BACKGROUND OF THE INVENTION

This invention relates to pulsed-transmission, single-frequency echo ranging systems, and more particularly to the array used to form the received acoustic beam in very high resolution side-scanning sonars.

The principal objective of this invention is to reduce the level of grating (side)-lobes caused by spatially undersampled hydrophone arrays.

A further objective is to increase the quality of sonic images that are produced by an array having a given number of staves.

A third objective is to reduce the number of array staves needed to produce an image of given quality.

DETAILED DESCRIPTION OF THE INVENTION

Nearly all sonars having very high resolution beams (beam widths less than 0.5 degrees), operate in the near field (Fresnel) region, and must be focused to produce useful beam patterns. This is most commonly accomplished by constructing a linear array of discrete hydrophone staves so that electronic time delays can be applied to the stave outputs. The individual delays are selected in such a way that the curvature of the arriving spherical wavefront is removed. In contrast to a physically curved array, electronic focusing allows continual refocusing at the appropriate range as the transmitted sound travels through the water. Additional advantages of a sampled array include the ability to (1) amplitude shade the array for increased side lobe rejection, (2) steer the beam, (3) form multiple beams with a single array and (4) change the effective length of the array as the sound travels to maintain a constant azimuthal resolution at all ranges.

Ideally, the staves should be spaced at intervals of not more than one-half wavelength so that spatial aliasing will not occur. This is analogous to the Nyquist sampling theorem in discrete time domain analysis, which requires the sampling frequency to be at least twice the highest signal frequency. For high resolution arrays this would typically necessitate several hundred staves; each with its own preamplifier, filter, time-varied gain stage, and possibly a heterodyne stage. In practice, therefore, arrays are usually undersampled deliberately for economies of cost, size, and power consumption.

The far field radiation pattern, which is also known as the array factor or space factor, of a linear array of n isotropic hydrophones uniformly spaced at intervals d is given by $$P_F(\beta) = \frac{\sin\left(\frac{n\pi d}{\lambda} \sin\beta\right)}{n \sin\left(\frac{\pi d}{\lambda} \sin\beta\right)} \quad (1)$$

where
$\beta$ = bearing angle
and
$\lambda$ = wavelength.

$\lambda$ = wavelength.

The radiation pattern of an array element of length D is given by $$P_S(\beta) = \frac{\sin\frac{\pi L}{\lambda} \sin\beta}{\frac{\pi D}{\lambda} \sin\beta} \quad (2)$$

By the well known product theorem, the far field radiation pattern of an array of equispaced staves is given by the product of equation (1) and equation (2), and in particular, when the array is completely filled, i.e., when d=D, the beam pattern is $$P_A(\beta) = \frac{\sin\left(\frac{\pi L}{\lambda} \sin\beta\right)}{\frac{\pi L}{\lambda} \sin\beta} \quad (3)$$

where
$L = nd = nD$

Figure 1:
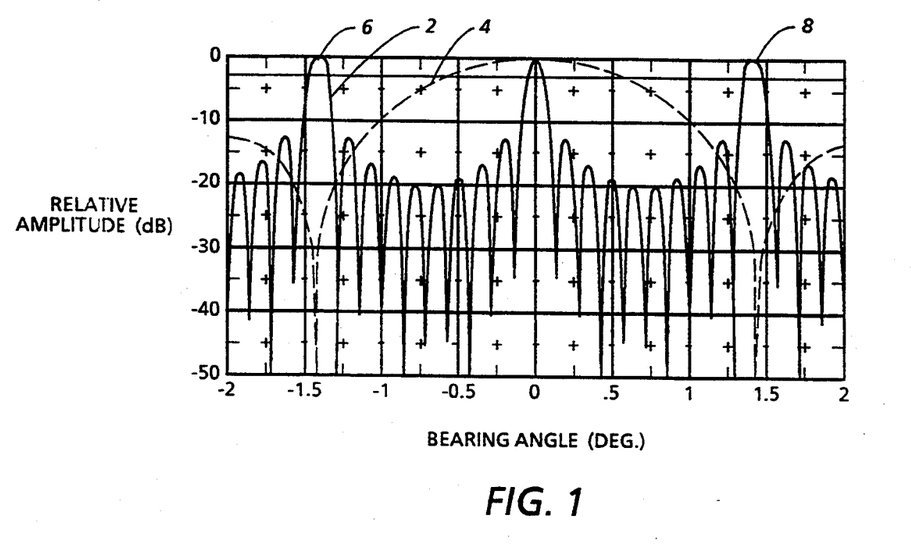
FIG. 1 is a graphic showing of array radiation patterns.

An example is shown in FIG. 1 where the solid curve 2 is the space factor of an array having 10 dimensionless hydrophones uniformly spaced at 40 wavelength intervals, and the dashed curve 4 is the pattern of a 40 wavelength stave. The major response lobes, 6 and 8, located at plus and minus 1.4 degrees are referred to as grating, side or ambiguous response lobes.

Figure 2:
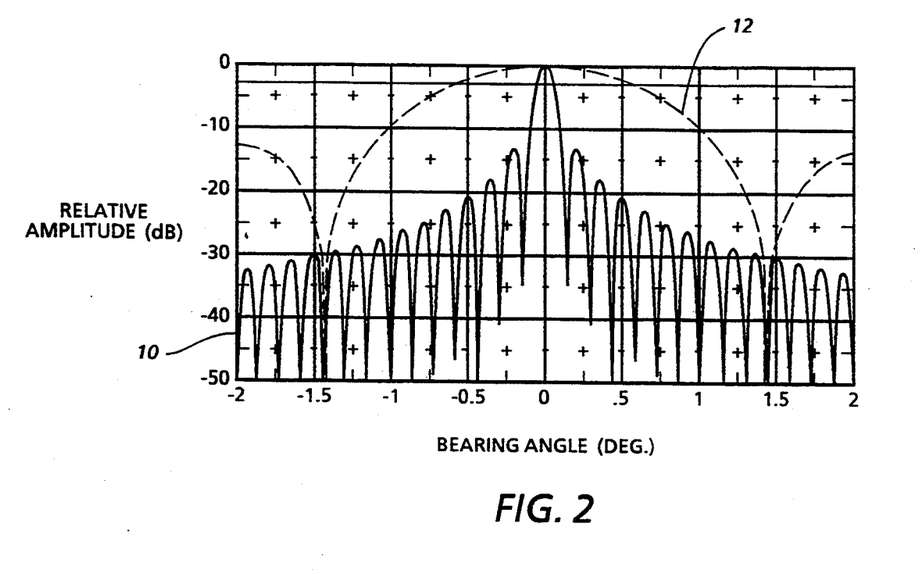
FIG. 2 is a graphic showing of array beam and stave radiation.

FIG. 2 shows the resulting array pattern in the solid curve 10 with the stave pattern (dashed curve) 12 repeated for reference. Grating lobes are absent. Thus we have an illustration of a case where an array can be successfully undersampled by a factor of 80 to 1. In this special case, the stave pattern may be thought of as the spatial equivalent of an anti-aliasing filter perfectly designed to suppress the ambiguous lobes of the space factor.

The more steering, focusing, or shading (or a combination of these) applied, the greater the level of the grating lobes. The grating lobe locations are a function of the stave spacing and, for an unsteered array, are given by $$\theta_g = \sin^{-1}\left(\frac{i\lambda}{d}\right) \quad (4)$$

where
$i = 0, \pm 1, \pm 2, \ldots$ and $\theta_g$ is the angle relative to the main response axis, or broadside to the array.

When operating in the near-field region of the array (i.e., distances less than $$\frac{(nd)^2}{\lambda},$$

beam patterns are extremely ill-behaved, and are not useful for producing sonar images. However, by focusing the array, radiation patterns near the focal region become substantially similar to ideal far-field patterns. Because the focal region is typically quite short, it is necessary to refocus frequently as the sonic pulse travels out in range. This can be accomplished conveniently by electronic means, as is usually done in high resolution sonars.

Figure 3:
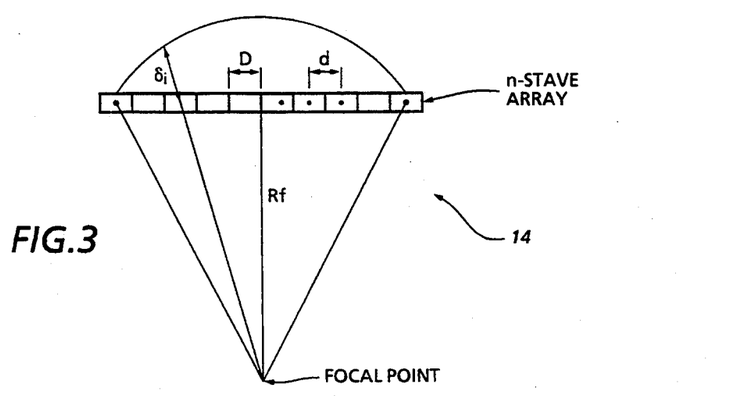
FIG. 3 is a representation of beam geometry from which time delays can be calculated.

The present invention is specifically concerned with reduction of grating lobes caused by focusing. Electronic focusing is normally achieved by introducing time delays into the stave outputs to compensate for the curvature of the wavefront. The delays are calculated from the geometry shown at 14 in FIG. 3 as $$T_i = \frac{\delta_i}{c} \quad (5)$$

where
$c$ = sound velocity, $$\delta_i = K - \sqrt{R_f^2 + \left[i - \left(\frac{N-1}{2}\right)\right]^2 d^2},$$

$R_f$ = desired focal distance,
$i$ = stave number = $1, 2, 3, \ldots N$, $$K = \sqrt{R_f^2 + \left(\frac{N-1}{2}\right)^2 d^2}$$

It will be evident to those skilled in the art that, for a narrow bandwidth sonar, phase shifts given by $$\phi_i = 2\pi f_0 T_i \quad (6)$$

where
$f_0$ = sonar operating frequency can be conveniently substituted for time delays if advantageous to the implementation.

When the array has been thus focused, the space factor grating lobe maxima will fall on lines originating at the array center and inclined at angles $\theta_g$ given by equation 4. If the stave length D is chosen equal to the stave spacing d, then at very large distances from the array, the stave pattern nulls, occurring at angles $$\theta_{sn} = \sin^{-1}\left(i\frac{\lambda}{D}\right) \quad (7)$$

Figure 4:
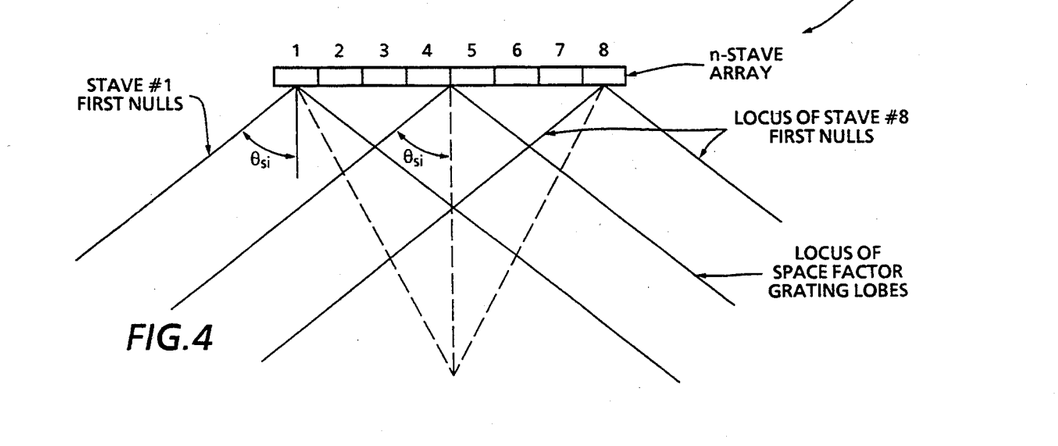
FIG. 4 is a showing of stave pattern nulls and array factor grating lobes.

$f_0$ = sonar operating frequency will all coincide with the space factor grating lobes and cancel them. However, at short ranges, even though all the stave pattern nulls occur at the same angle, they do not originate at the same point. They originate at the stave center of each stave, and therefore do not coincide. Hence they fail to cancel the space factor grating lobes. This is illustrated in FIG. 4 at 16. Only the first array factor grating lobes ($i = \pm 1$) and the first nulls ($i = \pm 1$) of the two end stave patterns are shown for clarity.

Figure 5:
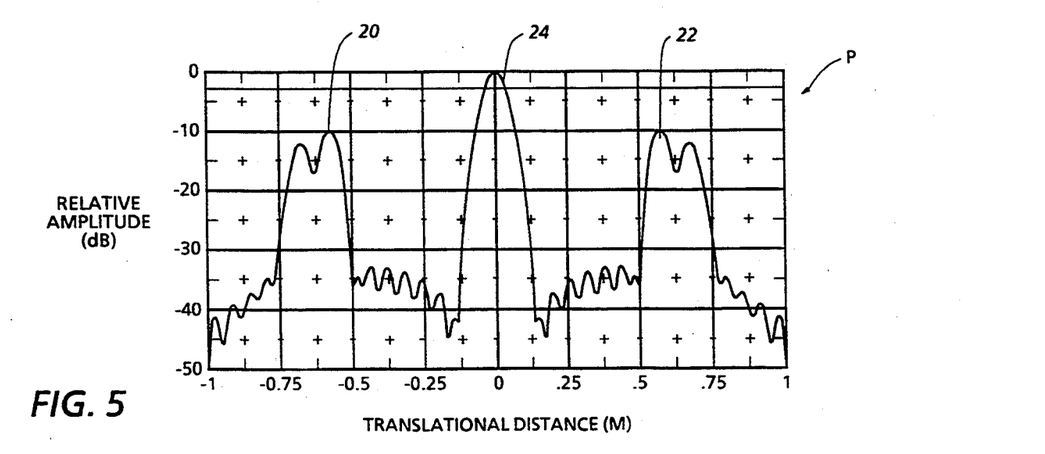
FIG. 5 is a graphic showing of the array response of a focussed line array showing large grating lobes.

A typical example of the resulting array beam pattern illustrates the undesirable grating lobes. In FIG. 5, the array response of a hypothetical 10 stave array with 40 wavelength stave length and spacing and focused at 25 meters is shown at 18. The array is shaded with a Dolph-Chebyshev amplitude window. The resulting array grating lobes at 1.4 degrees, 20 and 22, are only 10 dB below the main lobe response 24.

The present invention reduces the grating lobes significantly by forcing all the stave nulls to coincide with the space factor grating lobe at a particular range $R_{SF}$. This is accomplished by mechanically tilting each stave at a fixed angle relative to broadside of $$\theta_{STi} = \tan^{-1}\left(\frac{x}{R_{SF}}\right) \quad (8)$$

where $$x = \left[i - \left(\frac{N+1}{2}\right)\right]d$$

Figure 6:
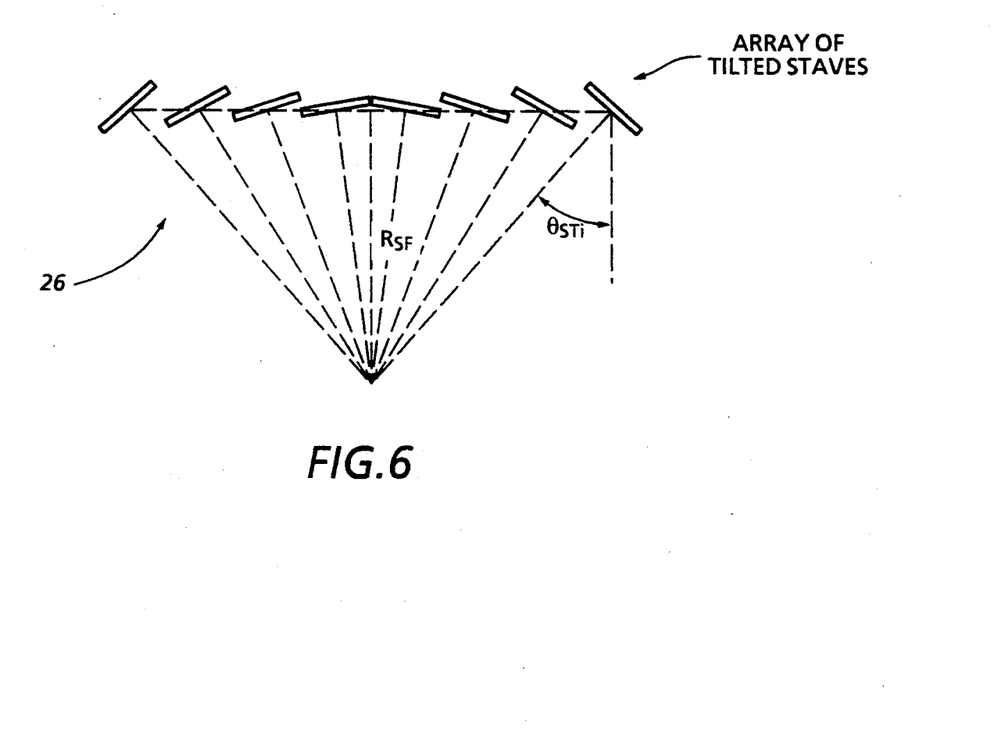
FIG. 6 is a showing of a fixed stave angle variable focal length linear array.
Figure 7:
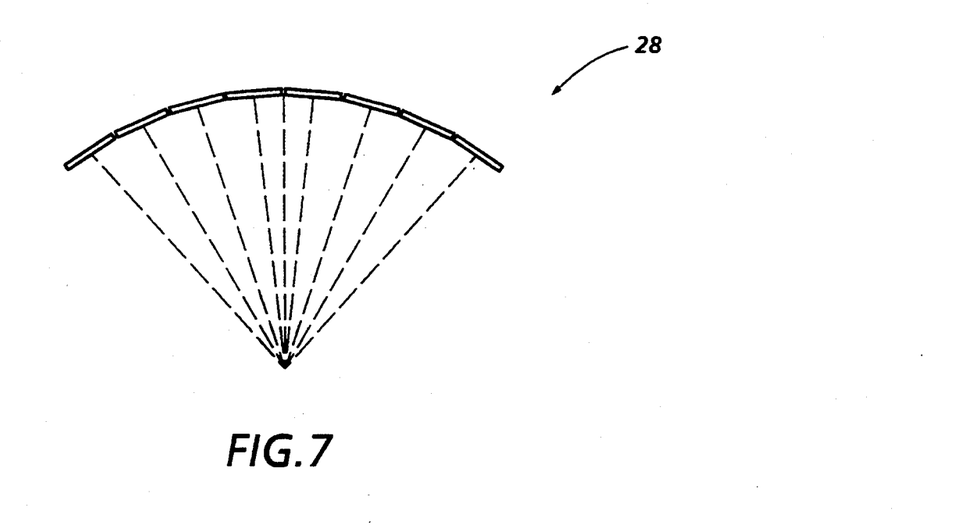
FIG. 7 is a showing of a fixed stave angle, variable focal length circular array.

This is illustrated in FIG. 6 at 26 in somewhat exaggerated form. It will be evident to those skilled in the art that a similar result can be obtained from the circular construction shown at 28 in FIG. 7 if the surface curvature is taken into account when selecting the time delays needed for variable range focusing. The latter arrangement may be more convenient for some applications. This design may be considered a fixed stave angle, variable focal-length array.

Figure 8:
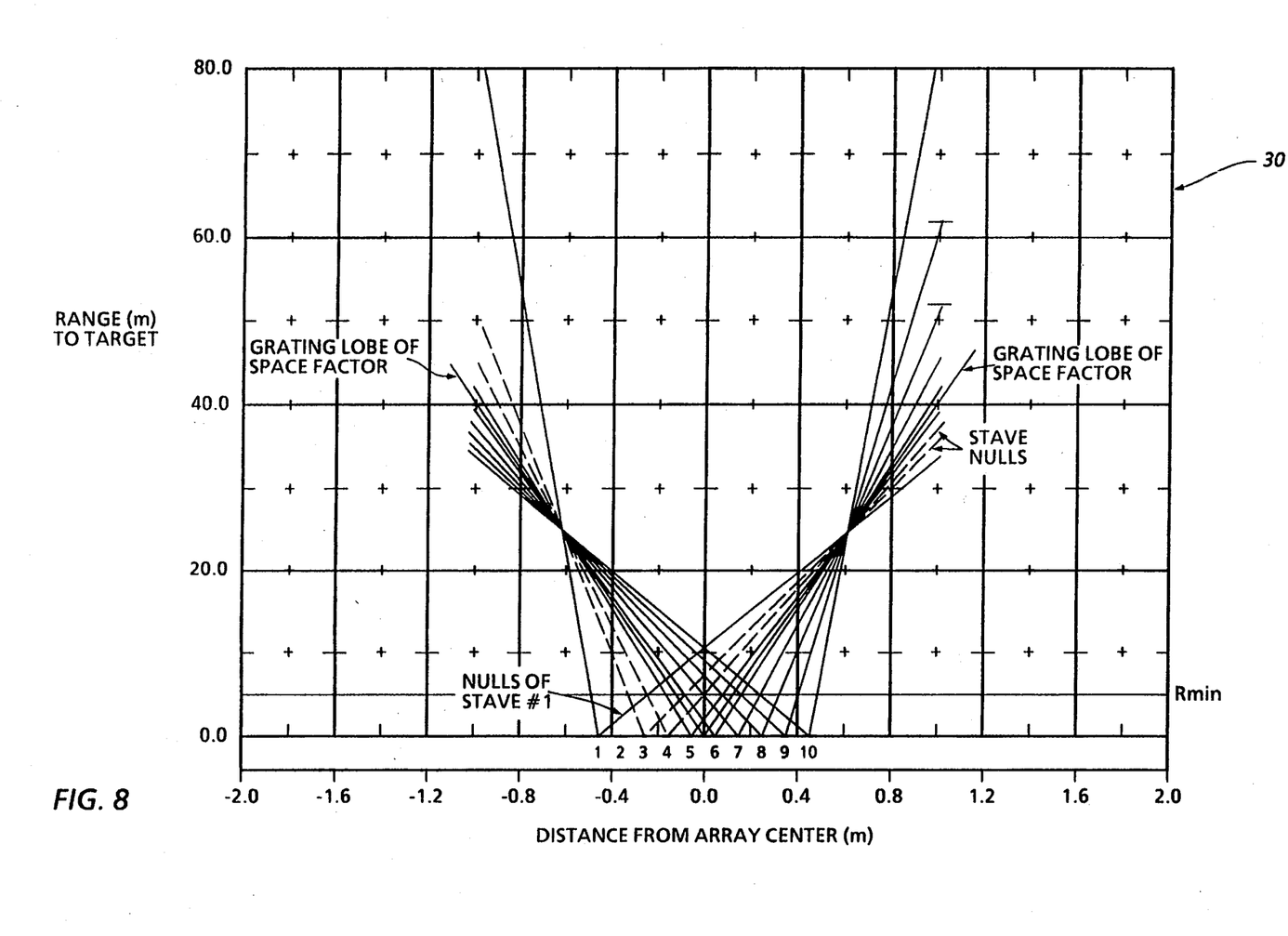
FIG. 8 is a graphic showing of the location of space factor grating lobes and stave nulls provided by the invention.
Figure 9:
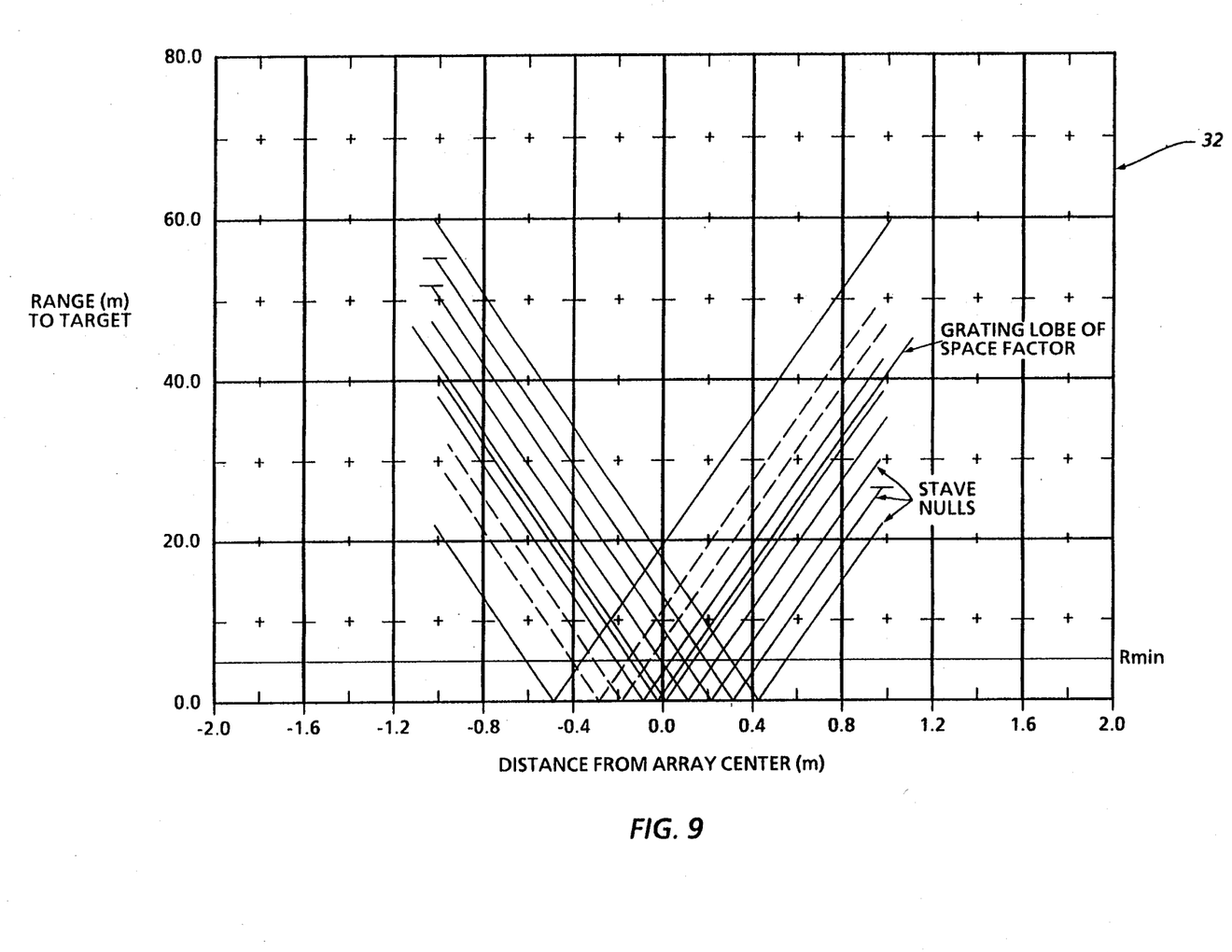
FIG. 9 is a graphic showing of the location of space factor grating lobes and stave nulls from a conventional line array.

The resulting coincidence of stave nulls and space factor grating lobes is illustrated at 30 in FIG. 8 where 25 meters was chosen for $R_{SF}$. By contrast to FIG. 9, in which is shown at 32 for a conventional array (untilted staves), a superior coincidence of nulls with grating lobes is maintained over nearly all the area of interest.

Figure 10:
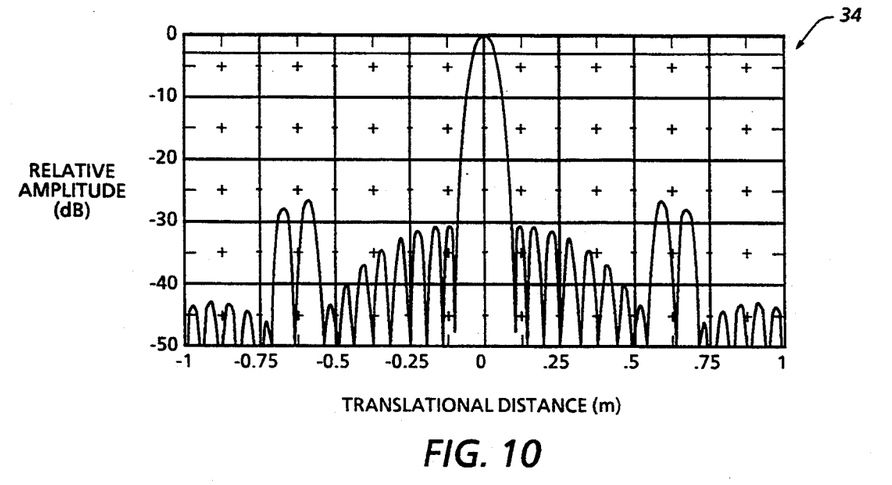
FIG. 10 is graphic showing of the array response provided by the invention with fixed stave angles and variable focal length.

The resulting radiation pattern of the array is shown at 34 in FIG. 10 at a range of 25 meters. The remaining grating lobes are due entirely to the discrete shading function and the portion due to focusing is completely removed. This pattern is essentially identical to that of an unfocused array at infinite range. This pattern should be compared to that shown in FIG. 5 where the grating lobe levels are 10 dB below the main lobe as opposed to 28 dB below for the technique of this invention.

Figure 11:
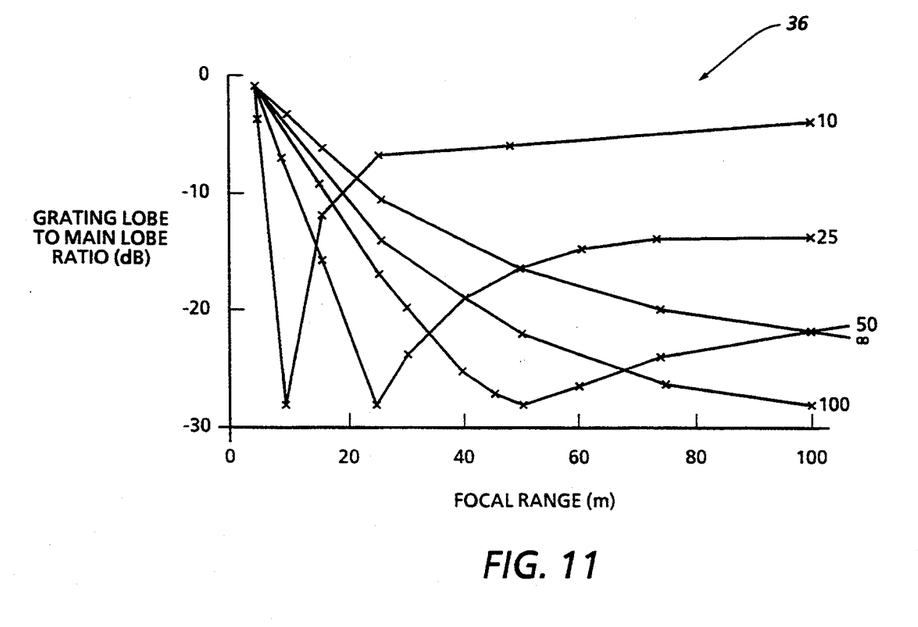
FIG. 11 is a graphic showing of grating lobe suppression versus focal range.

Since the staves are permanently fixed at particular angles, the array response is optimum for the designed range. When the focal distance is varied electronically from the designed range, grating lobe levels will increase. In FIG. 11 at 36, the calculated grating lobe to main lobe rejection ratio is plotted as a function of electronic focal distance for several values of $R_{SF}$. It will be observed that the resulting grating lobes are lower at all ranges from zero to twice the value of $R_{SF}$ compared to a conventional array. Further, the maximum range at which grating lobes are of concern may be less than the maximum operating range of the sonar. Thus $R_{SF}$ might be chosen as somewhat less than half of the maximum operating range to obtain optimal grating lobe rejection over the ranges of interest. This case might arise if the projector pattern could be confined in such a way that the receive array grating lobes fall outside the project pattern beyond some range and are thus not of interest.

In summary, this invention significantly improves the beam patterns of very high resolution sonar arrays at all ranges by means of an ingenious combination of electronically varied space factor focus and mechanically fixed stave tilt angles.

The invention described herein can be applied equally well to linear arrays, curved arrays (including irregular shapes), and to slightly aperiodic arrays that are operated in the nearfield. The basic principle of the invention could also be applied to phased radar arrays.

I claim:

1. Apparatus for reducing the radiation level of grating lobes relative to the level of the main lobe in a multi-element antenna array used to transmit and receive radiation signals comprising an array of stave elements which are tilted at a predetermined angle with respect to the main response axis, each of the stave elements having a signal output, and means for electronically focussing the antenna array by providing a predetermined phase shift to each of the individual stave element signal outputs, wherein the predetermined phase shift is defined as follows:

$$\phi_i = 2\pi f_O T_i$$

where
$f_o$ = sonar operating frequency, and $$T_i = \frac{\delta_i}{c} \quad \text{where}$$

$c$ = sound velocity, $$\delta_i = K - \sqrt{R_f^2 + \left[i - \left(\frac{N-1}{2}\right)\right]^2 d^2},$$

$R_f$ = desired focal distance,
$i$ = stave number — 1,2,3, ... N, $$K = \sqrt{R_f^2 + \left(\frac{N-1}{2}\right)^2 d^2}$$

and $d$ = spacing between stave elements.

2. Apparatus as set forth in claim 1 wherein the predetermined angle is defined as follows:

$$\Theta_{STi} = \tan^{-1}\left(\frac{x}{R_{SF}}\right)$$

where $$x = \left[i - \left(\frac{N+1}{2}\right)\right]d,$$

$R_{SF}$ = range to the source of received signals, and
$N$ = the total number of staves.

* * * * *

UNITED STATES PATENT AND TRADEMARK OFFICE
CERTIFICATE OF CORRECTION

PATENT NO. : 5,414,676
DATED : May 9, 1995
INVENTOR(S) : William J. Zehner

It is certified that error appears in the above-indentified patent and that said Letters Patent is hereby corrected as shown below:

IN THE CLAIMS

Column 6, line 13, change the minus sign "-" to an equals sign -- = --

Signed and Sealed this

Twenty-seventh Day of June, 1995

Attest:

BRUCE LEHMAN

Attesting Officer      Commissioner of Patents and Trademarks